United States Patent Office

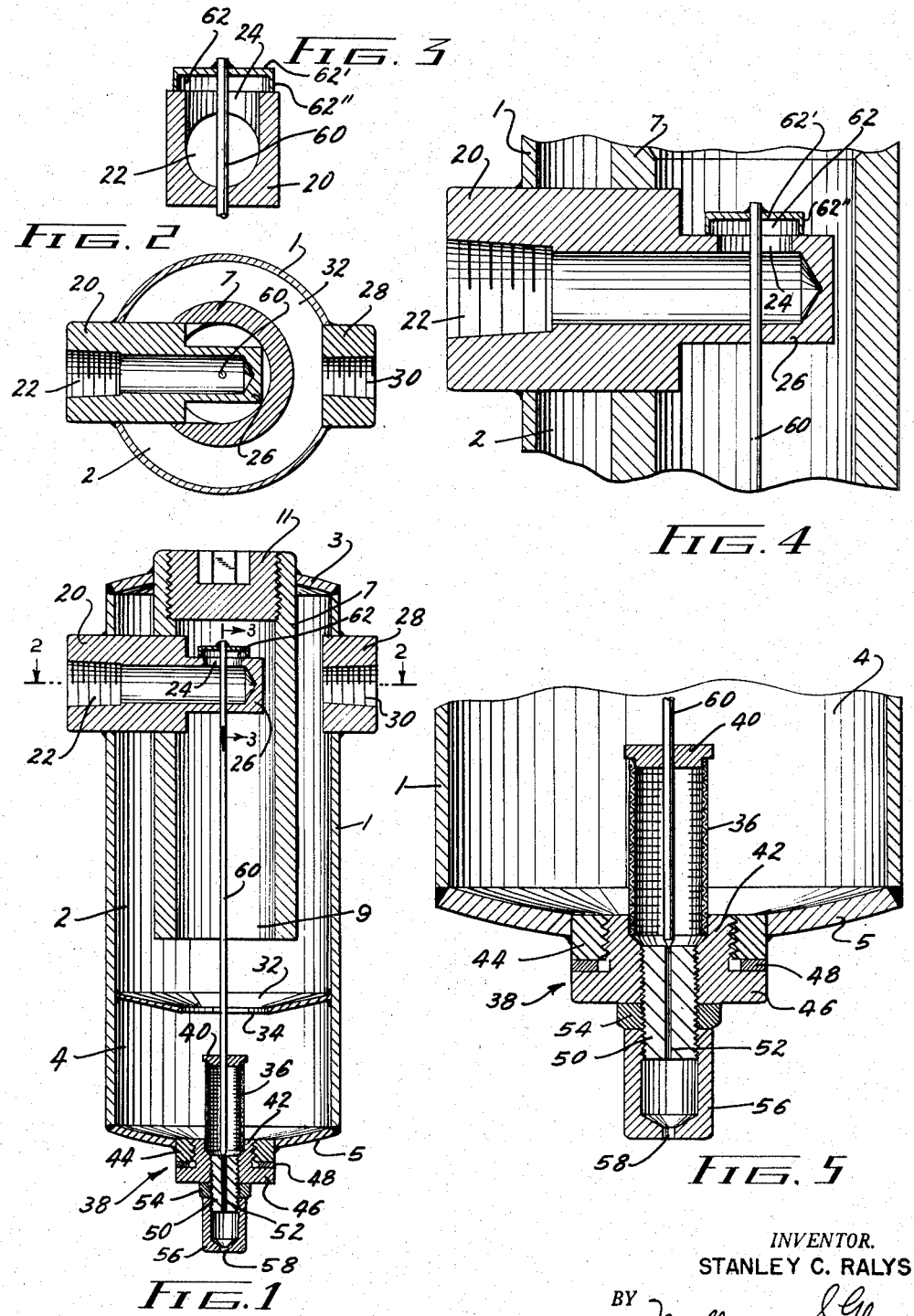

2,886,128
Patented May 12, 1959

2,886,128

SEPARATOR

Stanley C. Ralys, Orange, Mass., assignor to Leavitt Machine Company, Orange, Mass., a corporation of Massachusetts Application February 6, 1956, Serial No. 563,676

1 Claim. (Cl. 183—40)

The present invention relates to a separator to be used in a compressed air system to remove from the system any dirt, moisture, oil, scale or the like which may accumulate in the system.

One object of the present invention is the provision of a separator which will continuously and automatically removes the accumulations of dirt, grease, moisture, etc. from the system.

A further object of the present invention is to provide a separator which will remove the dirt, moisture, etc. from the system as an incident to the change in pressure in the system, without requiring special bleeding.

A further object of the invention is the provision in a separator, of means for separating out dust, moisture and the like upon the slightest pressure differential at opposite sides of the air inlet into the separator.

A further object of the present invention is to provide a bleeding valve which will bleed dirt, moisture, etc. without bleeding more than a negligible amount of air.

A further object of the invention is the provision of a valve unit of extremely small weight for controlling the bleeding of the system.

A further object of the invention is the provision in a compressed air system, of a separator having bleeding control means at one end, responsive to the slightest drop in pressure on opposite sides of the inlet point.

A further object of the invention is the provision of a bleeding control member comprised of a pressure differential responsive element at the inlet end of the separator, and a bleeding control element at the bleeding outlet, the two being connected and in alignment to move as a single unit.

Fig. 1 is a sectional side view of the separator;

Fig. 2 is a sectional view of the separator taken along lines 2—2 of Fig. 1;

Fig. 3 is a sectional view of the separator taken along line 3—3 of Fig. 1;

Fig. 4 is an enlarged sectional view of the air inlet of the separator showing the valve-bleeding control; and Fig. 5 is an enlarged sectional view of the separator bleeding valve.

Referring more particularly to the drawings, the separator comprises a body tube 1 closed at both ends by a top cap 3 and a bottom cap 5. A baffle tube 7 is mounted on the cap 3 and extends within the body tube 1 in spaced relation to the body tube 1. The baffle tube 7 is open at its bottom 9 and has the plug 11 at its top to make the body tube 1 airtight.

An inlet plug 20 extends into the body tube 1 and into the baffle tube 7 and has an inlet opening 22 therein to permit air to enter the separator chamber 2 through an opening 24 in a reduced portion 26 of the inlet plug 20 extending into the baffle tube 7.

An outlet plug 28 extending through body tube 1 has an outlet 30 therethrough open to the separator chamber 2 for the passage of air from the separator chamber 2 into the system, so that air entering the baffle tube 7 through inlet opening 24 will descend to the lower end of the baffle tube 7 and then move upwardly through the separation chamber 2 and pass into the system through outlet port 30. This permits moisture, oil, dirt, etc. to drop on an equalizer plate 32 mounted within the body tube 1 below the lower end of the baffle tube 7 which separates the body tube 1 into a separator chamber 2 and collection or settling chamber 4.

The equalizer plate 32 has downwardly sloping sides opening into a central opening 34. This permits moisture and oil to run off the equalizer plate 32 through the opening 34 and descend into the collection chamber A. The opening 34 is shown as approximately of the same size as the baffle tube 7 so that dirt or scale will fall directly through the opening 34 into the collection chamber 4 without settling on the equalizer plate 32.

When moisture, oil, dirt, or scale fall through the opening 34 in the plate 32, it settles on the bottom 5. The walls of the bottom 5 are sloped downwardly toward the center so that the dirt, moisture, oil, etc. settle on the center of the bottom 5 around a strainer 36 which is mounted on a bleeding valve assembly 38. The strainer 36 comprised of a mesh material permits moisture and fine dirt to pass through upon opening of a valve in the valve assembly 38 but will screen out heavier particles such as large particles of dirt or scale. The strainer 36 has a closure cap 40 thereon to prevent particles from entering the strainer except through its mesh walls.

The discharge of oil, grease, dirt, etc. is controlled automatically by the valve assembly 38 which comprises a body 42 threaded onto a ring 44 mounted on the cap 5 and having flange 46 extending therefrom which bears against washer 48 interposed between the valve body 42 and the ring 44 to make an airtight closure. Threaded within the valve body 42 is an orifice plug 50 having passageway 52 therethrough communicating with the interior of strainer 36. The valve body 42 and the orifice plug 5 are locked together by a lock nut 54 to make the assembly 38 complete. A nipple 56 having a central discharge opening 58 therein, is shown threaded on the lower end of the orifice plug 50.

The orifice 52 is normally closed by a valve rod 60 of extremely small cross-section, which extends through the strainer 36, strainer cap 40, opening 34 in the equalizer plate 32, baffle tube 7, the reduced portion 26 of the inlet plug 20, and the opening 24. The valve rod 60 carries at its top, a cap 62 which normally seats on the reduced portion 26 of the inlet plug 20 to cover the opening 24 therein. The lower pointed end of the valve rod 60 seats on the bevelled inlet end of passageway 52 through an orifice plug 50 to normally close that orifice. The valve rod 60 and the orifice 52 are capillary in cross-section so that a minimum amount of air will be forced out of the separator when the valve orifice 52 is opened upon elevation of valve rod 60.

Upon reference to Figs. 2, 3 and 4 of the drawings, it will be observed that: the inlet plug 20 is shown as having a top wall $24^1$; its passageway 22 terminates in endwall 26; the inlet opening 24 thereof to the separator, is through the top wall $24^1$; cap 62 is cup-shaped and closed at its upper end by endwall $61^1$ which is always held spaced from the top wall $24^1$ and its inlet opening 24, by its peripheral flange $62^{11}$; the transverse dimensions of flange $62^{11}$ are greater than those of inlet opening 24; valve rod 60 attached to cap 62 extends downwardly through inlet plug 20 and collection chamber 4 and is of such length to seat its bevelled end on the bevelled seat at the upper end of discharge passageway 52 at the bottom of the separator, when cap 62 is seated as shown in the drawings, and to this end the orifice plug 50 is made adjustable by threading; and an extremely thin cleaning pin 60¹ extends downwardly from the bottom tip end of valve rod 60 through discharge passageway 52 whose diameter is shown as smaller than that of valve rod 60.

It will be observed further that when no compressed air is passing through inlet opening 24, cap 62 will seat on top wall 24¹ of plug 20 and the discharge passageway 52 will be closed by the tip end of rod 60. However, as soon as compressed air is started into the system horizontally through passageway 22, the flow will be redirected upwardly through inlet opening 24 and will lift the cap and valve rod assembly 62—60, to open discharge passageway 52 and thus permit bleeding therethrough of any fluids, grit and the like which may have passed through the strainer and collected at the bottom of the collection chamber 4. Because of the small cross-sectional size of the passageway 52, the invention contemplates that the strainer be such as not to pass solid particles which are too large to pass through that passageway.

It will now be pointed out that cap 62 is preferably made from relatively light thin sheet material and that thickness of the valve rod suspended therefrom is made as small in cross section as is practical (for example, of the order of point .022 inch) so that the combined weight of both is as small as circumstances permit. Valve rod 60 is therefore normally held to its seat entirely by the relatively small weight of the assembly.

It will be understood further that whenever during the operation of the pressure system, the downward pressure on the top face of wall 62¹ of cap 62, is less than the upward pressure on the underface of that wall, the cap 62 will be elevated to bleed the collection chamber in the manner above set forth regardless of whether this differential in pressure on opposite sides of the wall 62¹ is the result of increase in consumption of compressed air or a decrease in pressure at the inlet 24 or of both. Such differential occurs constantly and upon each occasion, the system will be bled of grit, dirt and the like, and the passageway 52 will be cleared by the cleaning pin 60. Since compressed air will pass through inlet opening 24 whenever and as long as this aforementioned differential in pressure exists, so it can be said that elevation of the cap and rod assembly is elevated dynamically by the impulse of the air flow through inlet opening 24. The small weight of that assembly makes the system extremely sensitive and quickly responsive to the slightest measure of such pressure differential. This sensitivity is increased by the fact that the operating pressure differential is measured on opposite faces of cap wall 62¹ to a degree where the cap 62 will flutter with successive changes so as to bleed the system continuously.

It will be further observed: that the disc 62 is of the reaction or impulse type; that it is positioned at the point where the pressure from the system enters the separator; that the disc is elevated kinetically by a stream of air as it passes through the inlet opening 24; that the pressure required to lift the disc is extremely slight so that the disc will elevate upon the slightest differential pressures; that the orifice 52 is made adjustable toward and away from the bottom of the valve rod 60 to assure a tight seat when the valve is closed; that the pressure in the system is reduced by bleeding only to an insignificant degree; and that when the pressure is shut off entirely the discharge air acts to clean wire 10 and increase its effectiveness.

The operation of the device will be apparent from the above description. The separator 1 is placed in the compressed air system by connecting the inlet and outlet pipes (not shown) to the inlet plug 20 and the outlet plug 28, respectively. The cap 62 rests on the reduced portion of the inlet plug 20 to cover the opening 24 therein, and the valve rod 60 seats on the orifice 52 to close it. The air passes through opening 24 in the inlet plug 20 and lifts cap 62 to thereby enter the top of baffle tube 7, and then travels downwardly along the baffle tube 7 and then upward about and through the separator chamber 2. In its downward movement, any dirt or scale will fall into the collection chamber 4 through the opening 34 in the equalizer plate 32. Moisture, grit and the like will separate out and fall on the equalizer plate 32 and in turn will run off into the collection chamber 4 through opening 34 and settle on bottom 5. Since the bottom 5 slopes downwardly, the separated matter accumulates around strainer 36. When the orifice 52 is opened by lifting the valve rod 60, the pressure within the separator will force air through the strainer 36 and out of the orifice 52 carrying with it fine dirt, oil and moisture. Larger particles of dirt and scale will be caught in the mesh of the strainer 36 and retained therein. When the mesh of the strainer 36 becomes clogged, the valve body 42 can be removed by unscrewing and the strainer can be cleaned or replaced by a new one.

It will be evident that the above provides a separator which will remove the accumulations of oil, moisture, dirt, scale, etc. from a compressed air system automatically as an incident to the change in pressure in the system without removing more than a small amount of air at each bleeding.

What is claimed is:

A separator to be inserted into a compressed air system, to remove therefrom water, oil and the like comprising a casing closed at its top and bottom and having air inlet and outlet ports, and an open bottomed baffle chamber supported therewithin in laterally spaced apart relation thereto and terminating intermediate the casing height and defining a separation chamber therebelow; an air inlet tube extending from the inlet port into the baffle chamber and opening thereunto through its top face to redirect the flow of air upwardly into the baffle chamber, a venting passageway through the lower end of the casing, having a valve seat, a pin and means carried thereby for suspending the pin for free gravitational movement downwardly to normally seat on the valve seat to close the venting passageway incident entirely and only to its weight, said last mentioned means comprising a widened portion at the upper end of the pin and located in the baffle chamber above and in the path of the air flow through the opening in the top face of the air inlet tube when the pin is in its lowered passageway closing position so that the elevation of the pin will be effected whenever the air pressure is started in the system through the inlet tube and also on each occasion during the operation of the system when the upward pressure against the under face of the widened portion exceeds that in the baffle chamber to that slight degree sufficient to lift the weight of the pin.

References Cited in the file of this patent

UNITED STATES PATENTS

| | | |
|---|---|---|
| 1,937,855 | Stuard | Dec. 5, 1933 |
| 2,036,106 | Stuard | Mar. 31, 1936 |
| 2,467,408 | Semon | Apr. 19, 1949 |
| 2,692,026 | Frantz | Oct. 19, 1954 |